US009128345B2

(12) United States Patent
Veenman et al.

(10) Patent No.: US 9,128,345 B2
(45) Date of Patent: Sep. 8, 2015

(54) ELECTROCHROMIC DEVICE HAVING AN IMPROVED FILL PORT PLUG

(71) Applicant: Gentex Corporation, Zeeland, MI (US)

(72) Inventors: Steven J. Veenman, Grandville, MI (US); William L. Tonar, Holland, MI (US); Joel A. Stray, Hudsonville, MI (US); Leroy J. Kloeppner, Jenison, MI (US); David L. Poll, Holland, MI (US); Gary J. Dozeman, Zeeland, MI (US); Nalini C. Menon, Grand Rapids, MI (US); Kevin L. Ash, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/464,563

(22) Filed: Aug. 20, 2014

(65) Prior Publication Data

US 2014/0355096 A1 Dec. 4, 2014

Related U.S. Application Data

(63) Continuation of application No. 13/731,615, filed on Dec. 31, 2012, now Pat. No. 8,891,154, which is a continuation of application No. 13/022,912, filed on Feb. 8, 2011, now Pat. No. 8,345,345, and a (Continued)

(51) Int. Cl.
*G02F 1/153* (2006.01)
*G02F 1/161* (2006.01)
(Continued)

(52) U.S. Cl.
CPC ........ *G02F 1/161* (2013.01); *G02F 1/15* (2013.01); *G02F 1/157* (2013.01); *G02F 2201/50* (2013.01); *G02F 2202/00* (2013.01); *G02F 2202/02* (2013.01); *G02F 2202/023* (2013.01)

(58) Field of Classification Search
USPC .................................. 359/265–275
See application file for complete search history.

(56) References Cited

U.S. PATENT DOCUMENTS 3,215,038 A 11/1965 Heller et al.
3,280,701 A 10/1966 Donnelly et al.
(Continued)

FOREIGN PATENT DOCUMENTS

JP 0285388 3/1990
WO WO-98/42796 10/1998
WO WO-99/02621 1/1999

OTHER PUBLICATIONS

International Search Report and Written Opinion in International Application No. PCT/US2014/024942 dtd Aug. 7, 2014 (7 pages).

(Continued)

*Primary Examiner* — Mohammed Hasan
(74) *Attorney, Agent, or Firm* — Foley & Lardner LLP; Scott P. Ryan

(57) ABSTRACT

An electrochromic device including: (a) a first substantially transparent substrate having an electrically conductive material associated therewith; (b) a second substrate having an electrically conductive material associated therewith; (c) an electrochromic medium contained within a chamber positioned between the first and second substrates which includes: (1) a solvent; (2) an anodic material; and (3) a cathodic material, wherein both of the anodic and cathodic materials are electroactive and at least one of the anodic and cathodic materials is electrochromic; (d) wherein a seal member, the first substrate, the second substrate, and/or the chamber includes a plug associated with a fill port; and (e) wherein the plug is at least partially cured with an antimonate photo initiator and/or is a one- or two-part plug which comprises a resin or mixture of resins that are substantially insoluble and/or substantially immiscible with an associated electrochromic medium while in the uncured state.

18 Claims, 7 Drawing Sheets

Related U.S. Application Data continuation-in-part of application No. 12/215,712, filed on Jun. 27, 2008, now Pat. No. 7,884,995.

(60) Provisional application No. 60/937,354, filed on Jun. 27, 2007.

(51) Int. Cl.
G02F 1/15 (2006.01)
G02F 1/157 (2006.01)

(56) References Cited

U.S. PATENT DOCUMENTS

| | | |
|---|---|---|
| 3,451,741 A | 6/1969 | Manos |
| 3,453,038 A | 7/1969 | Kissa et al. |
| 3,521,941 A | 7/1970 | Deb et al. |
| 3,652,149 A | 3/1972 | Rogers |
| 3,692,388 A | 9/1972 | Hall, Jr. et al. |
| 3,774,988 A | 11/1973 | Rogers |
| 3,806,229 A | 4/1974 | Schoot et al. |
| 3,807,832 A | 4/1974 | Castellion |
| 3,854,794 A | 12/1974 | Van Dam et al. |
| 3,873,185 A | 3/1975 | Rogers |
| 4,116,545 A | 9/1978 | Reddy |
| 4,139,234 A | 2/1979 | Morgan |
| 4,142,783 A | 3/1979 | Engler et al. |
| 4,174,152 A | 11/1979 | Giglia et al. |
| 4,227,779 A | 10/1980 | Bissar et al. |
| 4,282,272 A | 8/1981 | Matsuhiro et al. |
| 4,294,518 A | 10/1981 | O'Connor et al. |
| 4,297,401 A | 10/1981 | Chern et al. |
| RE30,835 E | 12/1981 | Giglia |
| 4,304,465 A | 12/1981 | Diaz |
| 4,306,774 A | 12/1981 | Nicholson |
| 4,338,000 A | 7/1982 | Kamimori et al. |
| 4,418,102 A | 11/1983 | Ferrato |
| 4,435,048 A | 3/1984 | Kamimori et al. |
| 4,440,910 A | 4/1984 | O'Connor |
| 4,449,786 A | 5/1984 | McCord |
| 4,465,339 A | 8/1984 | Baucke et al. |
| 4,473,695 A | 9/1984 | Wrighton et al. |
| 4,519,930 A | 5/1985 | Kakiuchi |
| 4,550,982 A | 11/1985 | Hirai |
| 4,561,625 A | 12/1985 | Weaver |
| 4,586,792 A | 5/1986 | Yang et al. |
| 4,613,211 A | 9/1986 | Papir et al. |
| 4,652,090 A | 3/1987 | Uchikawa et al. |
| 4,671,619 A | 6/1987 | Kamimori et al. |
| 4,695,490 A | 9/1987 | McClelland et al. |
| 4,702,566 A | 10/1987 | Tukude |
| 4,712,879 A | 12/1987 | Lynam et al. |
| 4,741,603 A | 5/1988 | Miyagi et al. |
| 4,750,817 A | 6/1988 | Sammells |
| 4,761,061 A | 8/1988 | Nishiyama et al. |
| 4,795,242 A | 1/1989 | Wudl et al. |
| 4,807,977 A | 2/1989 | Sammells |
| 4,810,067 A | 3/1989 | Demiryont |
| 4,824,221 A | 4/1989 | Endo et al. |
| 4,832,467 A | 5/1989 | Miyagi et al. |
| 4,852,979 A | 8/1989 | Agrawal |
| 4,871,236 A | 10/1989 | Gemma et al. |
| 4,872,745 A | 10/1989 | Fujisawa et al. |
| 4,893,908 A | 1/1990 | Wolf et al. |
| 4,902,108 A | 2/1990 | Byker |
| 4,908,283 A | 3/1990 | Takahashi et al. |
| 4,927,246 A | 5/1990 | Ito et al. |
| 4,962,158 A | 10/1990 | Kobayashi et al. |
| 4,973,844 A | 11/1990 | O'Farrell et al. |
| 4,993,810 A | 2/1991 | Demiryont |
| 5,028,124 A | 7/1991 | Akhtar |
| 5,042,923 A | 8/1991 | Wolf et al. |
| 5,066,112 A | 11/1991 | Lynam et al. |
| 5,068,062 A | 11/1991 | Inata et al. |
| 5,073,012 A | 12/1991 | Lynam |
| 5,076,674 A | 12/1991 | Lynam |
| 5,080,471 A | 1/1992 | Cogan et al. |
| 5,115,346 A | 5/1992 | Lynam |
| 5,122,896 A | 6/1992 | Mizusaki et al. |
| 5,128,799 A | 7/1992 | Byker |
| 5,134,175 A | 7/1992 | Lucey |
| 5,140,455 A | 8/1992 | Varaprasad et al. |
| 5,142,407 A | 8/1992 | Varaprasad et al. |
| 5,148,014 A | 9/1992 | Lynam et al. |
| 5,151,816 A | 9/1992 | Varaprasad et al. |
| 5,180,757 A | 1/1993 | Lucey |
| 5,202,787 A | 4/1993 | Byker et al. |
| 5,206,756 A | 4/1993 | Cheshire |
| 5,207,492 A | 5/1993 | Roberts |
| 5,231,531 A | 7/1993 | Defendini et al. |
| 5,233,461 A | 8/1993 | Dorman et al. |
| 5,239,405 A | 8/1993 | Varaprasad et al. |
| 5,239,406 A | 8/1993 | Lynam et al. |
| 5,278,693 A | 1/1994 | Theiste et al. |
| 5,280,380 A | 1/1994 | Byker |
| 5,282,077 A | 1/1994 | Byker |
| 5,353,148 A | 10/1994 | Eid et al. |
| 5,356,947 A | 10/1994 | Ali et al. |
| 5,360,837 A | 11/1994 | Honda et al. |
| 5,457,218 A | 10/1995 | Cronin et al. |
| 5,500,760 A | 3/1996 | Varaprasad et al. |
| 5,554,664 A | 9/1996 | Lamanna et al. |
| 5,567,749 A | 10/1996 | Sawamura et al. |
| 5,572,354 A | 11/1996 | Desmond et al. |
| 5,576,687 A | 11/1996 | Blank et al. |
| 5,596,023 A | 1/1997 | Tsubota et al. |
| 5,596,024 A | 1/1997 | Horie et al. |
| 5,679,283 A | 10/1997 | Tonar et al. |
| 5,790,298 A | 8/1998 | Tonar |
| 5,818,625 A | 10/1998 | Forgette et al. |
| 5,910,854 A | 6/1999 | Varaprasad et al. |
| 5,928,572 A | 7/1999 | Tonar et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,063,839 A | 5/2000 | Oosedo et al. |
| 6,137,620 A | 10/2000 | Guarr et al. |
| 6,141,137 A | 10/2000 | Byker et al. |
| 6,157,480 A | 12/2000 | Anderson et al. |
| 6,165,386 A | 12/2000 | Endo et al. |
| 6,166,849 A | 12/2000 | Coleman et al. |
| 6,188,505 B1 | 2/2001 | Lomprey et al. |
| 6,193,912 B1 | 2/2001 | Theiste et al. |
| 6,241,916 B1 | 6/2001 | Claussen et al. |
| 6,242,602 B1 | 6/2001 | Giri et al. |
| 6,249,369 B1 | 6/2001 | Theiste et al. |
| 6,361,879 B1 | 3/2002 | Tsutsumi et al. |
| 6,420,036 B1 | 7/2002 | Varaprasad et al. |
| 6,519,072 B2 | 2/2003 | Nishikitani et al. |
| 6,521,354 B1 | 2/2003 | Shimizu et al. |
| 6,535,322 B2 | 3/2003 | Asano et al. |
| 6,555,187 B1 | 4/2003 | Kitamura |
| 6,569,361 B1 | 5/2003 | Berneth et al. |
| 6,597,489 B1 | 7/2003 | Guarr et al. |
| 6,620,510 B1 | 9/2003 | Taguchi et al. |
| 6,700,692 B2 | 3/2004 | Tonar et al. |
| 6,710,906 B2 | 3/2004 | Guarr et al. |
| 6,714,334 B2 | 3/2004 | Tonar |
| 6,787,606 B1 | 9/2004 | Chen |
| 6,906,842 B2 | 6/2005 | Agrawal et al. |
| 7,046,418 B2 | 5/2006 | Lin et al. |
| 7,047,633 B2 | 5/2006 | Morganelli et al. |
| 7,075,112 B2 | 7/2006 | Roberts et al. |
| 7,182,830 B2 | 2/2007 | Liang et al. |
| 7,190,505 B1 * | 3/2007 | Stray et al. ............ 359/265 |
| 7,202,987 B2 | 4/2007 | Varaprasad et al. |
| 7,372,611 B2 | 5/2008 | Tonar et al. |
| 7,450,292 B1 | 11/2008 | Burrell et al. |
| 7,494,231 B2 | 2/2009 | Varaprasad et al. |
| 8,345,345 B2 | 1/2013 | Veenman et al. |

(56) References Cited

U.S. PATENT DOCUMENTS 8,599,466 B2 12/2013 Agrawal et al.
2011/0176195 A1 7/2011 Veenman et al.

OTHER PUBLICATIONS

International Search Report and Written Opinion in International Application No. PCT/US2008/008064 dtd Sep. 9, 2008 (11 pages).
Non-Final Office Action in U.S. Appl. No. 13/731,615 dtd Feb. 6, 2014 (16 pages).
Notice of Allowance in U.S. Appl. No. 13/731,615 dtd Jun. 12, 2014 (9 pages).
US 5,148,305, 9-1992, Byker (withdrawn).
Ciba Irgacure 651, Ciba Specialty Chemicals, Edition Apr. 1, 2001, accessed at http://people.rit.edu/deemc/courses/0305-676/reference/Imprint/irgacure_651.pdf.

* cited by examiner

ELECTROCHROMIC DEVICE HAVING AN IMPROVED FILL PORT PLUG

CROSS-REFERENCE TO RELATED APPLICATION(S)

This application is a continuation of U.S. application Ser. No. 13/731,615, filed Dec. 31, 2012, which is a continuation of U.S. application Ser. No. 13/022,912, filed Feb. 8, 2011, now U.S. Pat. No. 8,345,345, which is a continuation-in-part of U.S. application Ser. No. 12/215,712, filed Jun. 27, 2008, now U.S. Pat. No. 7,884,995, which claims the benefit of U.S. Provisional Application Ser. No. 60/937,354, filed Jun. 27, 2007, each of which is hereby incorporated herein by reference in its entirety—including all references cited therein.

BACKGROUND OF THE INVENTION

1. Field of the Invention

The present invention relates in general to electrochromic devices and, more particularly, to an electrochromic device having a first substrate, a second substrate, a seal member and/or a chamber which comprises a plug associated with a fill port, wherein the plug comprises an antimonate and/or is at least partially cured with an antimonate photo initiator. The present invention further relates to a one- or two-part plug as is disclosed herein, wherein the plug comprises a resin or mixture of resins that are substantially insoluble and/or substantially immiscible with an associated electrochromic medium while in the uncured state.

2. Background Art

Electrochromic (EC) devices have been known in the art for several years. Furthermore, electrochromic devices having plugs associated with fill ports are likewise well known.

Although such fill port plugs have been readily utilized, issues relative to plug compatibility, curability and/or reliability remain paramount to the commercialized success of electrochromic devices such as, for example, electrochromic mirrors, electrochromic windows, and electrochromic aircraft transparencies. Indeed, incomplete plug curing and/or failure can not only render an associated electrochromic device inoperable, but leakage of the electrochromic medium contained within the electrochromic device can also substantially damage the interior of, for example, an automobile, building, and/or aircraft—the owners and/or manufacturers of which can be completely intolerable of such an occurrence. In addition, gas permeability and/or barrier properties of a plug can compromise the longevity and/or functionality of an associated device.

It has now been surprisingly discovered that selective incorporation of one or more antimonate photo initiators into the fill port plug formulation facilitates a more complete cure of the same, which, in turn, increases plug compatibility, curability and/or reliability towards minimization and/or elimination of plug failure. It has further been discovered that such a plug configuration is particularly compatible with not only a conventional seal member, but also a first substrate, a second substrate, and/or a chamber.

Another aspect of the present invention deals with selecting liquid resin monomers or oligomers to use in a plug formulation that are generally not miscible and/or soluble with associated electrochromic media. The solvents used in a typical solution phase electrochromic device are usually very polar in nature. Many uncured resins such as Bis A or Bis F epoxy resins are completely soluble in the liquid or un-gelled electrochromic media. This means that as the uncured plug material is injected into the fill opening some of the plug material can dissolve into the electrochromic (EC) media before the plug can be cured. Generally, the larger the cell gap the more this intermixing occurs. The uncured plug material that dissolves into the electrochromic media is there for the life of the device and can cause premature device failure. These failure modes include electrode passivation, instability in UV, visible hazing of the EC media and/or color change. In accordance with the present invention, resins have been uncovered that are generally not miscible and/or soluble in the polar EC media. If a plug material is formulated using these resins there is little or no intermixing of the uncured plug material and the EC media prior to plug cure. If the insoluble plug material in the cured form does not have all of the attributes that are required of a plug material (such as low oxygen and moisture permeability, good adhesion, high temperature stability, etcetera) this material can be backed up with a secondary plug material of choice that has all these attributes without concern for its interaction with the EC media.

It is therefore an object of the present invention, among other objects, to provide an electrochromic device that remedies the aforementioned detriments and/or complications associated with the use of conventional fill port plugs.

SUMMARY OF THE INVENTION

The present invention is preferably directed to an electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; (d) wherein at least one of a seal member, the first substrate, the second substrate, and the chamber comprises a plug associated with a fill port; and (e) wherein the plug is at least partially cured with an antimonate photo initiator.

In one embodiment of the present invention, at least one of the first substrate and the second substrate preferably comprises a plug associated with a fill port.

In another embodiment of the present invention, the plug preferably comprises an epoxy resin.

In yet another embodiment of the present invention, the plug is preferably at least partially cured with cationic photoinitiating antimonate salt. In this embodiment the antimonate salt may comprise a sulfonium antimonate, an iodonium antimonate, an arylsulfonium antimonate, an aryliodonium antimonate, a triarylsulfonium antimonate, a biaryliodonium antimonate, a triarylsulfonium hexafluoroantimonate, a mixed triarylsulfonium hexafluoroantimonate, and/or a biaryliodonium hexafluoroantimonate.

In one aspect of the present invention, the antimonate preferably comprises at least one of the following formulae:

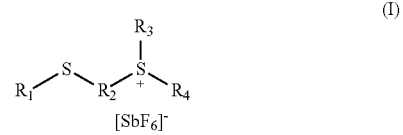

(II)

(III)

wherein $R_1$-$R_{13}$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof. In this embodiment, the antimonate preferably comprises at least one of the following chemical structures:

In another aspect of the present invention, the antimonate preferably comprises the following formula:

(III)

wherein $R_1$-$R_2$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof. In this embodiment, the antimonate preferably comprises one or more of the following chemical structures:

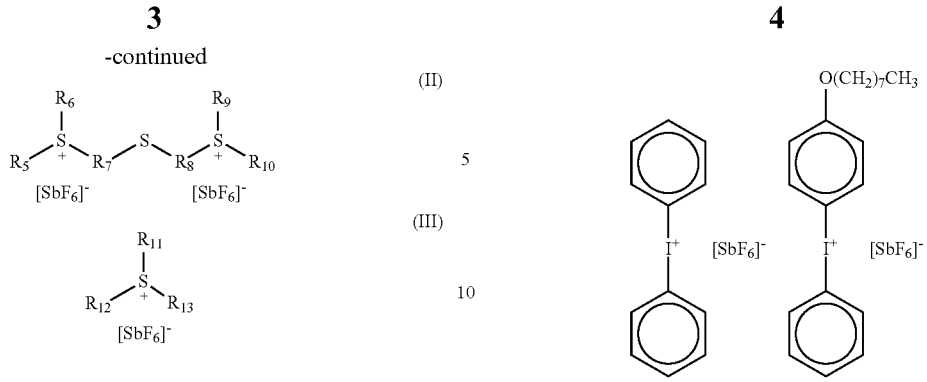

In one embodiment of the present invention, the cathodic material preferably comprises a viologen, a ferrocinium species, etcetera and/or the anodic material preferably comprises phenazine, such as a substituted phenazine.

In yet another preferred embodiment of the present invention, the concentration of the anodic and/or cathodic material preferably ranges from approximately 1 mM to approximately 500 mM, and more preferably from approximately 2 mM to approximately 100 mM.

In accordance with the present invention, the electrochromic medium preferably further comprises a cross-linked polymer matrix, a free-standing gel, and/or a substantially non-weeping gel.

In one embodiment of the present invention, the electrochromic medium preferably further comprises a redox buffer.

In another embodiment of the present invention, the electrochromic device preferably comprises an electrochromic window, electrochromic aircraft transparency, and/or an electrochromic mirror.

The present invention is also preferably directed to an electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; and (d) wherein at least one of a seal member, the first substrate, the second substrate, and the chamber comprises a one- or two-part plug associated with a fill port, as is disclosed herein, wherein the plug comprises a resin or mixture of resins that are substantially insoluble and/or substantially immiscible with an associated electrochromic medium while in the uncured state.

In one embodiment of the present invention, the two-part plug comprises a first sub-component comprising at least one of an epoxy resin, an acrylated butadiene, and mixtures thereof, and a second sub-component comprising an epoxy resin.

In another embodiment of the present invention, the fill port plug preferably comprises additives, such as tougheners, flexibilizers/crosslinkers, surface active agents, and/or cure indicators as are disclosed herein.

These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
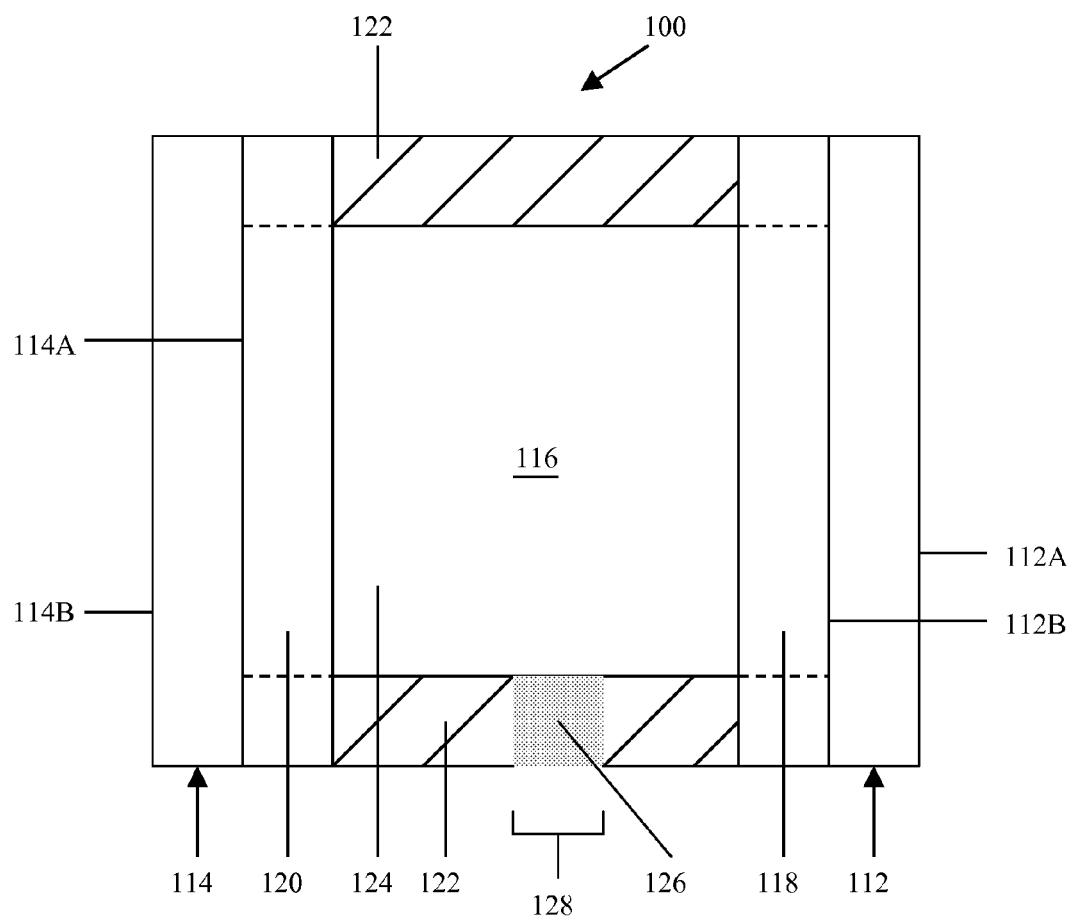
FIG. 1 of the drawings is a cross-sectional schematic representation of an electrochromic device fabricated in accordance with the present invention showing, among other things, a plug associated with a fill port of a conventional seal member.
Figure 2:
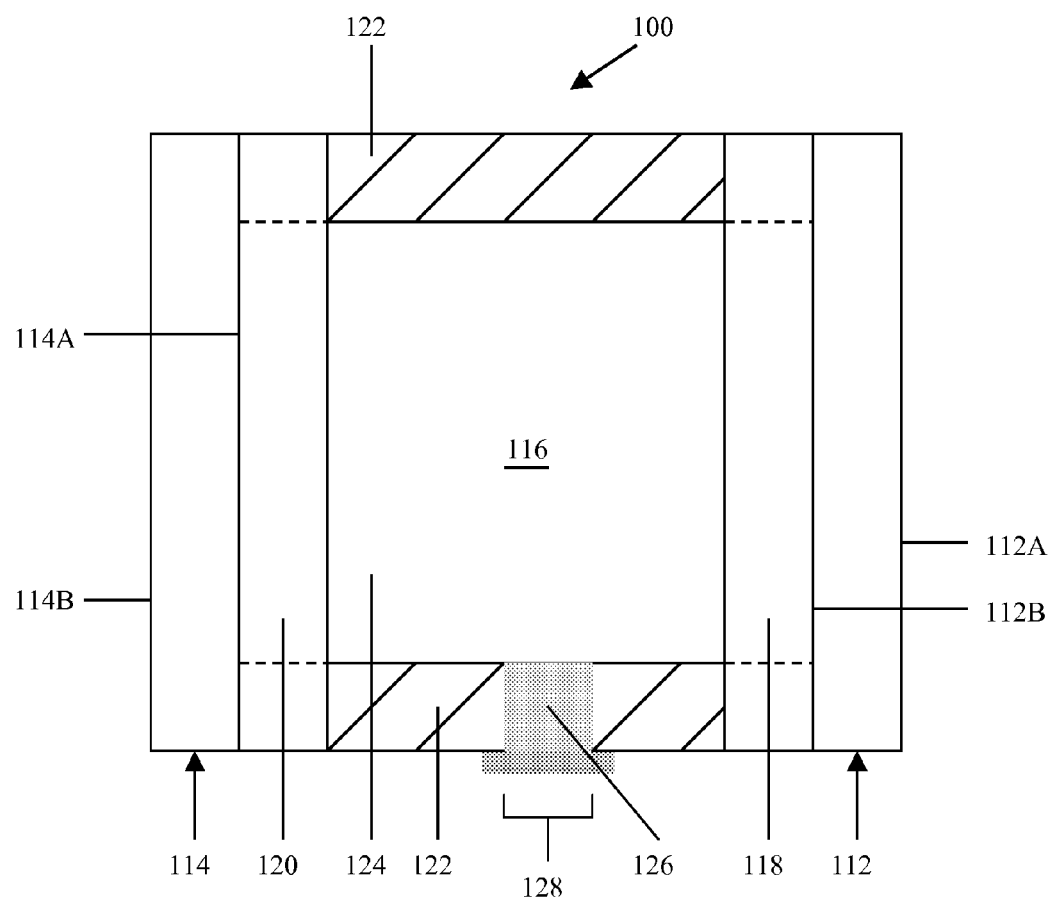
FIG. 2 of the drawings is a cross-sectional schematic representation of an electrochromic device fabricated in accordance with the present invention showing, among other things, a two-part plug associated with a fill port of a conventional seal member.
Figure 3:
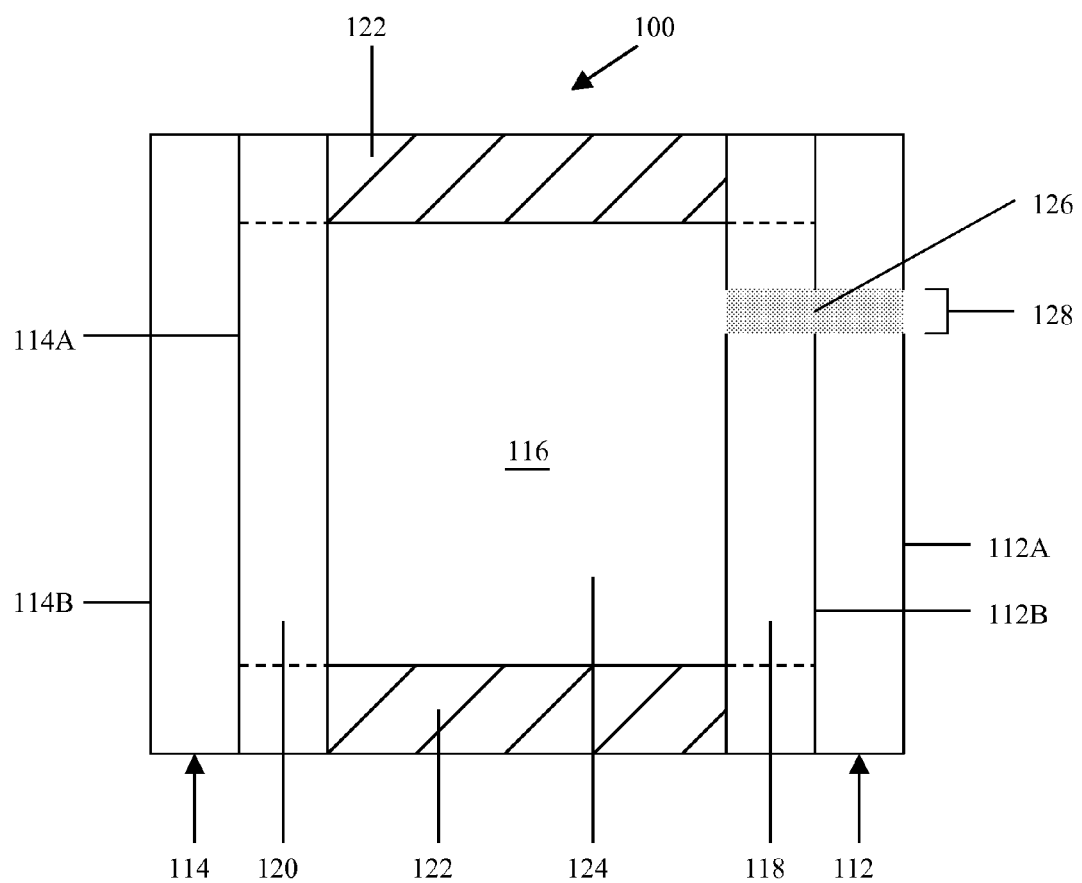
FIG. 3 of the drawings is a cross-sectional schematic representation of an electrochromic device fabricated in accordance with the present invention showing, among other things, a plug associated with a fill port of a substrate.
Figure 4:
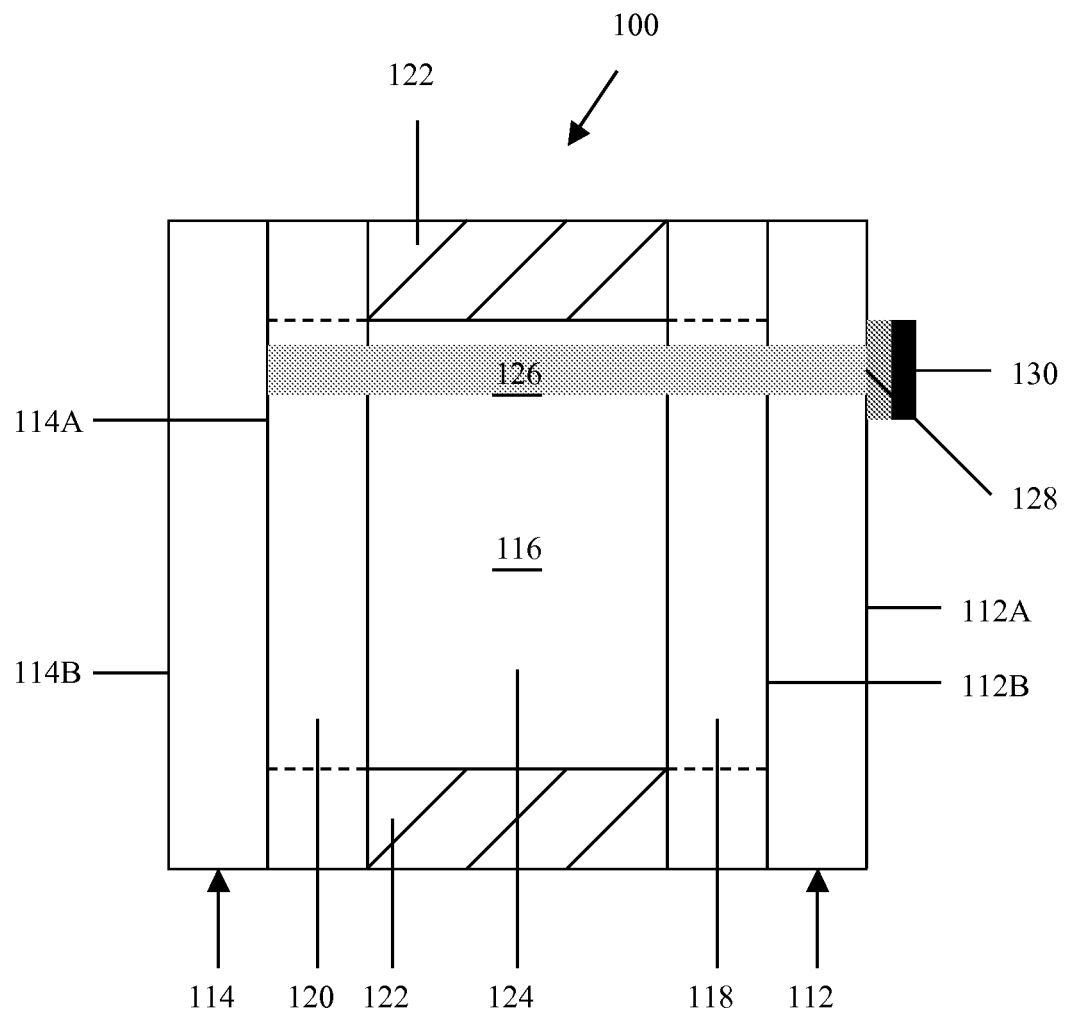
FIG. 4 of the drawings is a cross-sectional schematic representation of an electrochromic device fabricated in accordance with the present invention showing, among other things, a two-part plug associated with a fill port of a substrate.
Figure 5:
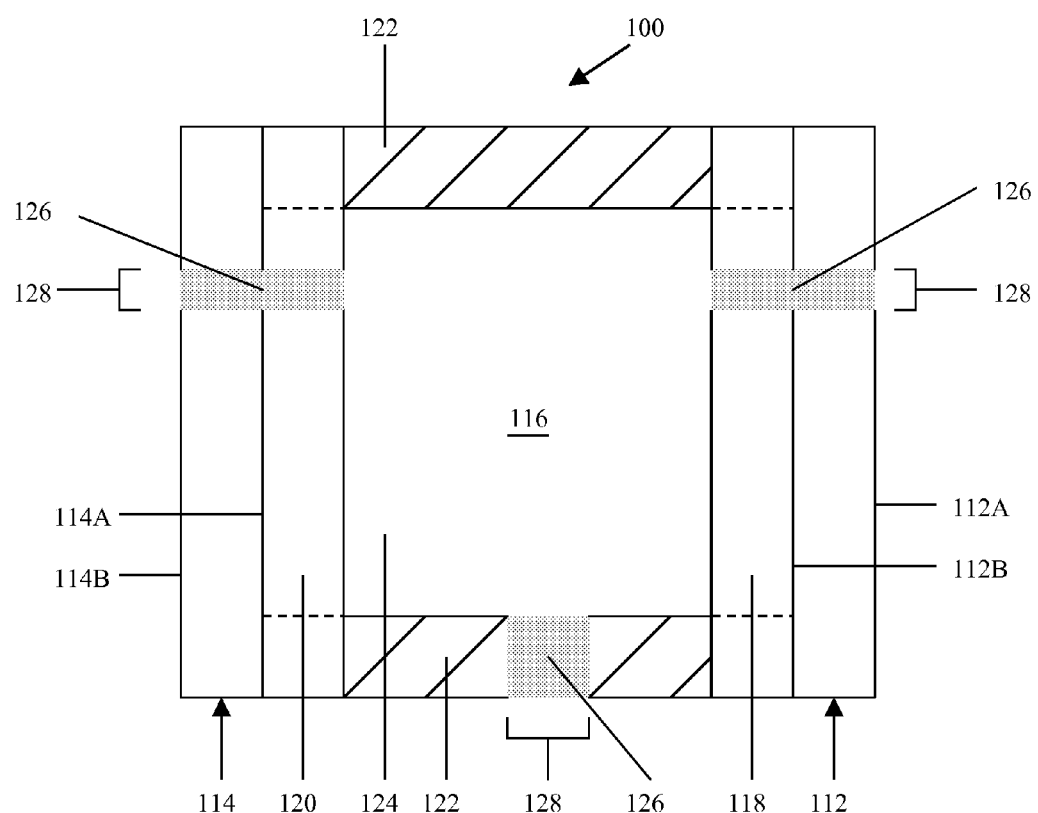
FIG. 5 of the drawings is a cross-sectional schematic representation of an electrochromic device fabricated in accordance with the present invention showing, among other things, a plug associated with a fill port of a first substrate, a second substrate, and a seal member.
Figure 6:
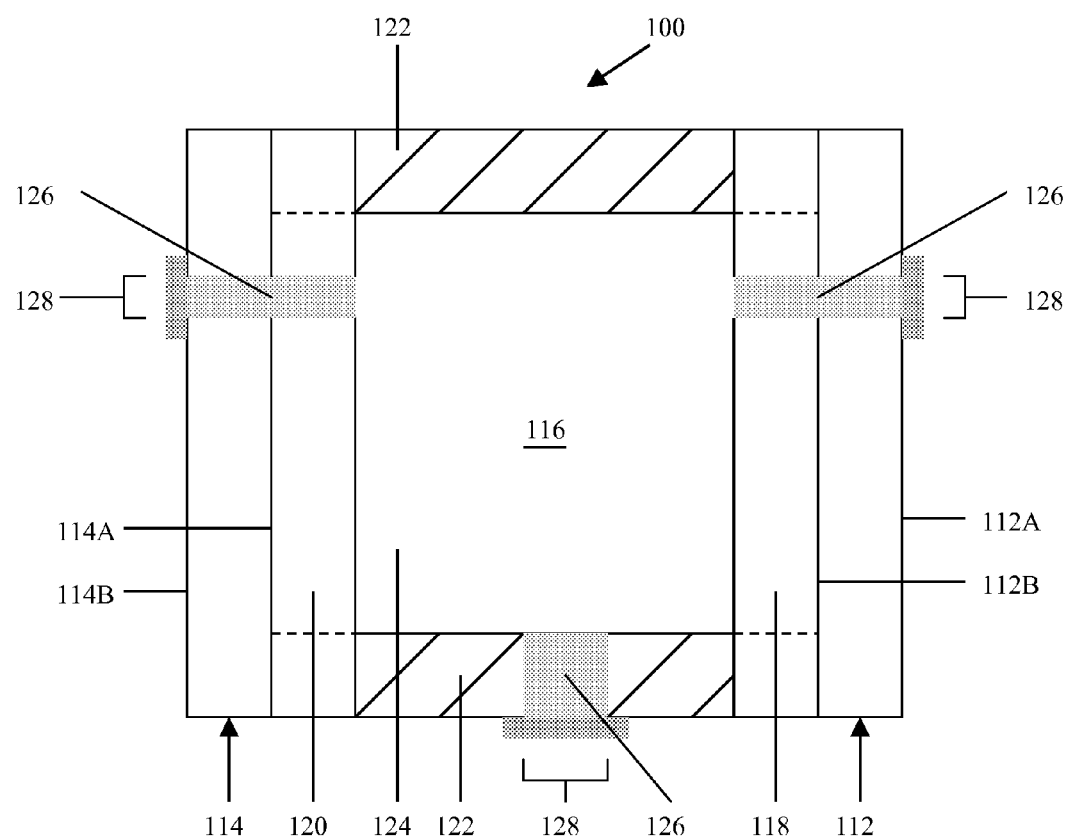
FIG. 6 of the drawings is a cross-sectional schematic representation of an electrochromic device fabricated in accordance with the present invention showing, among other things, a two-part plug associated with a fill port of a first substrate, a second substrate, and a seal member.
Figure 7:
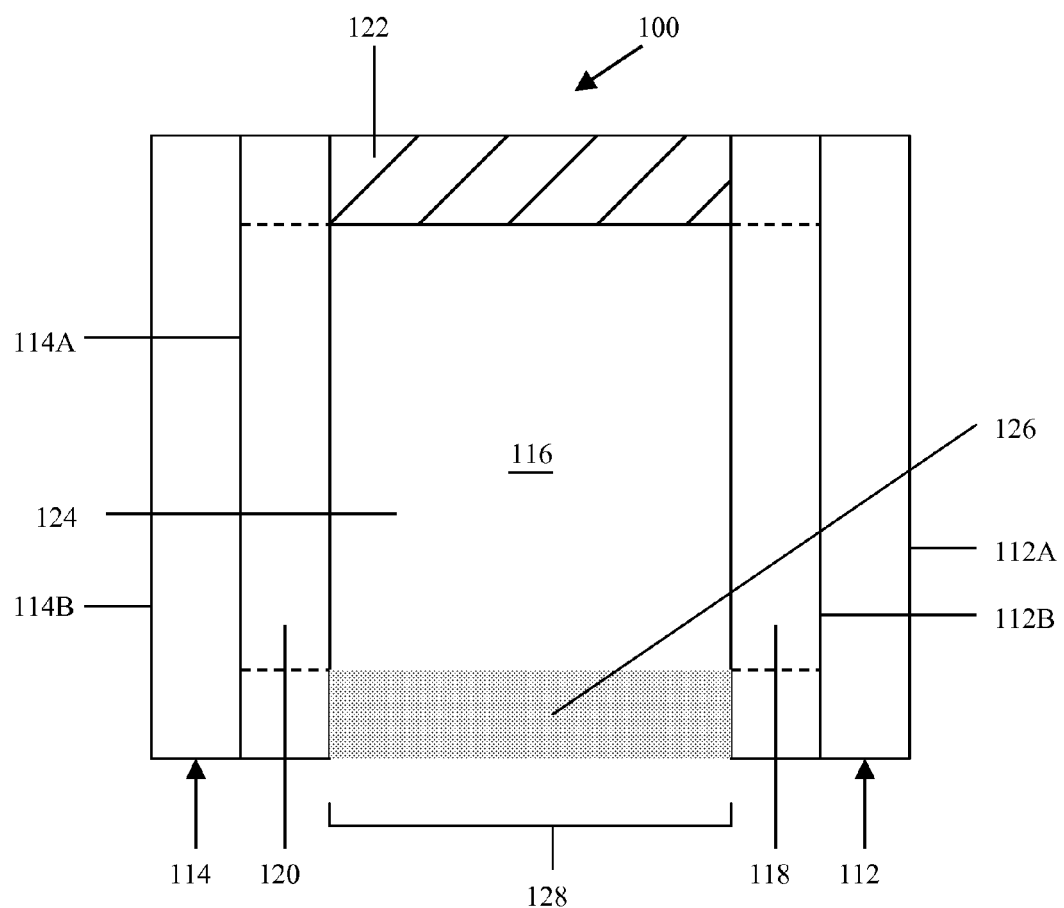
FIG. 7 of the drawings is a cross-sectional schematic representation of an electrochromic device fabricated in accordance with the present invention showing, among other things, a plug associated with a fill port.

Referring now to the drawings and to FIGS. 1-7 in particular, cross-sectional schematic representations of electrochromic devices 100 are shown, which generally comprise first substrate 112 having front surface 112A and rear surface 112B, second substrate 114 having front surface 114A and rear surface 114B, chamber 116 for containing electrochromic medium 124, and one or more plugs 126 associated with one or more fill ports 128. In accordance with the present invention, electrochromic devices 100 may comprise, for illustrative purposes only, a window, an aircraft transparency, a mirror, a display device, and the like. It will be understood that like or analogous elements and/or components, and/or methods referred to herein, may be identified throughout the drawings with like reference characters. It will be further understood that FIGS. 1-7 are merely schematic representations of electrochromic devices 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," U.S. Pat. No. 6,597,489 entitled "Electrode Design For Electrochromic Devices," and U.S. Pat. No. 6,700,692 entitled "Electrochromic Rearview Mirror Assembly Incorporating A Display/Signal Light," all of which are hereby incorporated herein by reference in their entirety including all references incorporated therein.

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. First substrate 112 is preferably fabricated from a sheet of glass having a thickness ranging from approximately 0.10 millimeters (mm) to approximately 12.7 mm, more preferably from approximately 0.50 mm to approximately 1.50 mm, and yet more preferably from approximately 0.75 mm to approximately 1.00 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material to help protect the substrate(s) and/or the electrochromic media from UV damage.

Second substrate 114 may be fabricated from similar materials as that of first substrate 112. However, if the electrochromic device is a mirror or comprises a mirrored surface, then the requisite of substantial transparency is not necessary. As such, second substrate 114 may, alternatively, comprise polymers, metals, glass, and ceramics—to name a few. Second substrate 114 is preferably fabricated from a sheet of glass or plastic having a thickness ranging from approximately 0.10 mm to approximately 12.7 mm, more preferably from approximately 0.50 mm to approximately 1.50 mm, and yet more preferably from approximately 0.75 mm to approximately 1.00 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide, or other materials known to those having ordinary skill in the art.

Electrically conductive material 120 is preferably associated with front surface 114A of second substrate 114, and is preferably operatively bonded to electrically conductive material 118 by sealing member 122. As can be seen in FIGS. 1-7, once bonded, sealing member 122, plug 126 and/or the juxtaposed portions of electrically conductive materials 118 and 120 serve to generally define an inner peripheral geometry of chamber 116. Alternatively, edge sealing techniques may be utilized which are disclosed in U.S. Pat. No. 7,372,611 entitled "Vehicular Rearview Mirror Elements And Assemblies Incorporating These Elements," filed on Feb. 25, 2005, which is hereby incorporated herein by reference in its entirety—including the associated priority documents.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

In accordance with the present invention, the cell spacing between inner surfaces of substrates 112 and 114 preferably ranges from approximately 10 microns (μm) to approximately 750 μm, and more preferably from approximately 20 μm to approximately 600 μm. However, it will be understood that the thickness of the cell spacing will depend largely upon the particular application of the electrochromic device.

Sealing member 122 may comprise any material that is capable of being adhesively bonded to the electrically conductive materials 118 and 120 to, in turn, seal chamber 116, (in certain embodiments in cooperation with plug 126 and fill port 128, see FIGS. 1, 2, 5, and 6) so that electrochromic medium 124 does not inadvertently leak out of the chamber. As is shown in dashed lines in FIGS. 1-7, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334, entitled "Electrochromic Device Having A Seal Including An Epoxy Resin Cured With A Cycloaliphatic Amine," all of which are hereby incorporated herein by reference in their entirety.

For purposes of the present disclosure, and as will be explained in greater detail herein below, electrochromic medium 124 typically comprises at least one solvent, at least one anodic material, and at least one cathodic material.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," the entirety of which is hereby incorporated herein by reference.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety.

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety—including all continuing applications/patents claiming priority therefrom. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithiazinebis(tetrafluoroborate) in U.S. Pat. No. 6,710,906 B2, which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. Pat. No. 6,710,906 B2 entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate (TT-BFc$^+$)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, U.S. Pat. No. 6,188,505, and U.S. Pat. No. 6,710,906 B2. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and/or cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In one aspect of the present invention plug 126 is associated with fill port 128, which preferably comprises an epoxy resin or mixture of resins (or other resins provided herein) and which is at least partially cured with a cationic photoinitiating antimonate salt and/or comprises an antimonate toward enhancing durability of plug 126 and/or compatibility of the same with electrochromic medium 124 and/or external atmospheric conditions. Such enhanced durability and/or compatibility preferably reduces the likelihood of any materials within electrochromic medium 124 being compositionally compromised and/or from inadvertently leaking out of chamber 116 through fill port 128. For purposes of the present disclosure, fill port 128 preferably comprises an aperture diameter ranging from approximately 1 mm to approximately 2 mm, and more preferably approximately 1.5 mm.

It will be understood that during normal fabrication of electrochromic device 100, fill port 128 is utilized to introduce electrochromic medium 124 into chamber 116 of electrochromic device 100. In certain embodiments (e.g. FIGS. 1, 2) partially fabricated electrochromic device 100 is placed with fill port 128 downward in an empty container or trough in a vacuum vessel and evacuated. Electrochromic medium 124 is introduced into the trough or container in a manner such that fill port 128 is submerged. The vacuum vessel is then backfilled, which forces electrochromic medium 124 through fill port 128 and, ultimately, into chamber 116. In certain other embodiments, (e.g. FIGS. 3, 4) such as an aircraft transparency, partially fabricated electrochromic device 100 is placed with fill port 128 upward in a vacuum vessel and evacuated. Electrochromic medium 124 is introduced into the container via conventional conduit in a manner such that fill port 128 is not submerged. Fill port 128 is then plugged preferably with a photo curing epoxy resin, (e.g. plug 126) which is at least partially cured with a cationic photoinitiating antimonate salt and/or comprises an antimonate. Such curing is preferably accomplished via a UV lamp. Additional discussions relative to the fabrication process of certain embodiments of electrochromic devices 100 are disclosed in U.S. Pat. No. 6,700,692, B2, which has been previously referenced and incorporated herein.

In one embodiment of the present invention, the formulation of plug 126 preferably comprises an epoxy resin or mixture of resins (e.g. cycloaliphatic epoxy resins including, for example, Omnilane OC1005, which is available from IGM Resins Inc., Bartlett, Ill., aromatic epoxy resins including, for example, Bis-F, Bis-A, and/or epoxy novolac resins including, for example, DER 354, DER 332, and DEN 431, which are all available from the Dow Chemical Company—all of which may be optionally filled with fumed silica or other fillers such as clay fillers, glass beads, calcium carbonate, aluminum oxide, calcium fluoride, or other fillers as desired) which are at least partially cured using one or more antimonate photo initiators, such as, for example, a sulfonium antimonate, an arylsulfonium antimonate, a triarylsulfonium antimonate, a triarylsulfonium hexafluoroantimonate, and a mixed triarylsulfonium hexafluoroantimonate, and combinations thereof. For purposes of the present disclosure, the sulfonium antimonate may be represented by one or more of the following formulae:

(I)

$$R_1 \overset{S}{\diagdown} R_2 \overset{S^+}{\diagdown} R_4$$
$$R_3$$
$$[SbF_6]^-$$

(II)

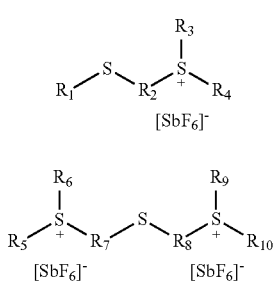

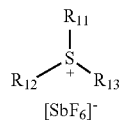

(III)

wherein $R_1$-$R_{13}$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof.

Specific examples of sulfonium antimonates which are commercially available from Union Carbide Corporation which is a wholly owned subsidiary of Dow Chemical Company include, for example:

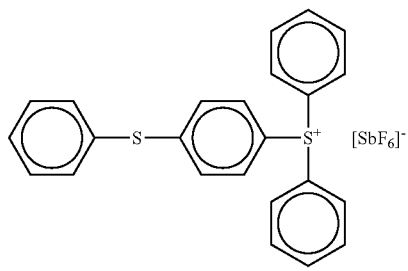

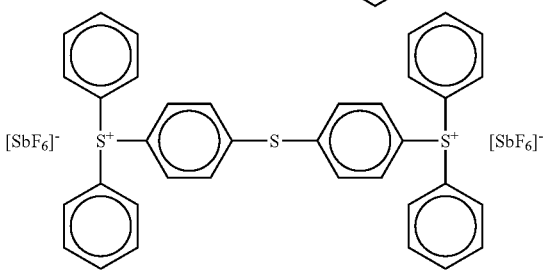

In another embodiment of the present invention, the formulation of plug 126 comprises an epoxy resin which is at least partially cured using one or more antimonate photo initiators, such as, for example, an iodonium antimonate, an aryliodonium antimonate, a biaryliodonium antimonate, a biaryliodonium hexafluoroantimonate, and mixtures thereof.

For purposes of the present disclosure, the iodonium antimonate may be represented by one or more of the following formula:

(III)

wherein $R_1$-$R_2$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof.

Specific examples of iodonium antimonates which are commercially available from Gelest Inc. include, for example:

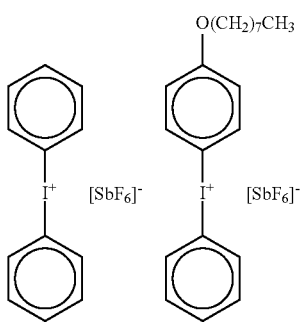

While specific antimonate photo initiators have been disclosed, for illustrative purposes only, it will be understood that any one of a number of antimonate initiators are contemplated for use in accordance with the present invention.

While specific anionic salts of photo initiators have been disclosed, for illustrative purposes only, it will be understood that any one of a number of other anions are contemplated for use in accordance with the present invention, including, for example, $AsF_6$, $Ga(C_6F_5)_4$, etcetera.

Without being bound to any one particular theory, it is believed that the antimonate facilitates better cross-linked density within plug 126, thereby enhancing at least durability of the same. It is further believed that the antimonate is a stronger acid than conventional counter ions, such as hexafluorophosphate, tetrafluoroborate, etcetera.

In another embodiment of the present invention, the formulation of plug 126 comprises a resin or mixture of resins (e.g. epoxy resins, such as epoxidized polybutadienes, epoxidized castor oil, epoxidized cashew nut oil, acrylated butadiene resins, silanes, siloxanes, block resins, urethanes, rubbers having a low glass transition temperature (e.g. Tg<25 degrees Centigrade) among other provided herein) that are substantially insoluble and/or substantially immiscible with an associated electrochromic medium (i.e. 124) while in the uncured state. It will be understood that the term substantially which respect to insoluble and/or immiscible will be defined herein, regardless of its ordinary meaning, as sufficiently insoluble and/or immiscible so that the short and/or long term performance of the associated device is not adversely affected. Preferably these materials will exhibit sufficient flexibility for use in their intended purpose, namely as a plug. By way of supporting example, the resin or mixture of resins may comprise Sartomer CN-301, Sartomer CN-304, and/or Rahn BR-643.

For purposes of the present invention it will be understood that resins other than acrylated (Sartomer CN-301), methacrylated (Sartomer CN-304) or epoxidized polybutabiene can be used in a plug formulation that are at least substantially insoluble and/or at least substantially immiscible in the EC media. Other insoluble monomers or oligomers available from Sartomer include CN-986 (aliphatic urethane acrylate), CN-2252 (polyester acrylate), CN-934 (aliphatic urethane acrylate), CN-975 (hexafunctional urethane acrylate), CN-965 (aliphatic urethane acrylate), CN-981 (aliphatic urethane acrylate), CN-973 (aromatic urethane acrylate), SR-489 (tridecyl acrylate) and SR-335 (lauryl acrylate)—just to name a few.

In yet another embodiment of the present invention, the formulation of plug 126 comprises two-parts, namely; a first sub-component comprising a resin or mixture of resins (e.g. silanes, siloxanes, polybutadienes, block resins, urethanes, rubbers having a low glass transition temperature (e.g. Tg 25< degrees Centigrade), epoxy resins, acrylated butadiene resins, among other provided supra and infra) that are substantially insoluble and/or substantially immiscible with an associated electrochromic medium (i.e. 124) while in the uncured state, and a second-subcomponent comprising a resin or mixture of resins (e.g. epoxy resins, urethane resins, phenolic resins, acrylic resins, cured at room temperature, thermally and/or with radiation, among other provided supra and infra) that exhibit desired permeability, adhesion, and/or stability characteristics. It will be understood that the second-subcomponent may also be compositionally analogous to seal member 122. In particular, the permeability of the second-subcomponent will preferably protect electrochromic medium 124 from air and/or moisture if the first-subcomponents exhibits permeability to air and/or moisture. Furthermore, the second-subcomponent will preferably adhere to at least the first-subcomponent toward maintaining device integrity over long periods of time—including one or more decades depending upon the application of the particular electrochromic device.

Additional non-limiting examples of resins that are suitable for use as second-subcomponent resins and/or resins cured with an antimonate photo initiator include conventional aliphatic amines, cycloaliphatic amines, amidoamines, mercaptans, cycloaliphatic epoxy resins such as Omnilane OC1005, which is available from IGM Resins Inc., Bartlett, Ill., aromatic epoxy resins such as Bis-F, Bis-A, and/or epoxy novolac resins such as DER 354, DER 332, and DEN 431, which are all available from the Dow Chemical Company, as well as thermal and/or photoinitiators, and optionally filled with fumed silica or other fillers such as clay fillers, glass beads, calcium carbonate, aluminum oxide, carbon black, etcetera, using conventional techniques.

It will be understood that the first sub-component of plug 126 can be introduced into fill port 128 which is generally compatible with the components of electrochromic medium 124 and subsequently cured. It will be further understood that the first sub-component of plug 126 may contact front surface 114A of second substrate 114 and/or electrically conductive material 120 (See FIG. 4). Next, the outer surface of the first sub-component, the outer surface of the first substrate and/or the surrounding area can be chemically modified to improve adhesion via, for example, silane primer, cleaned, abraded (e.g. mechanically) and/or etched if desired, prior to association of the second sub-component. Etching can be accomplished by several techniques including mechanical etching such as sandblasting, sandpaper, and chemical etching—just to name a few. After optionally etching, the second sub-component of plug 126 can be associated with the outer surface area the first sub-component, the outer surface of the first substrate and/or the surrounding area which is generally compatible with external atmospheric conditions/parameters.

Slipcover 130 is preferably associated with plug 126. Slipcover 130 serves to enhance both the final aesthetics of plug 126, as well as complete the final lamination process. Slipcover 130 is preferably fabricated from glass, but may also be fabricated from any one of a number of metals, natural and/or synthetic resins including, but not limited to Mylar, plastics, etcetera. It will be understood that slipcover 130 may also comprise a metal under layer to enhance impermeability, control transmissivity, and/or adhesion to associated surfaces. Slipcover 130 may comprise colored glass and/or plastics, and may also be made opaque via abrading, etching, etcetera. Slipcover 130 is preferably less than 1 mm thick, more preferably less than 0.85 mm thick, and yet more preferably approximately 0.7 mm thick. In one embodiment, slipcover 130 comprises a substantially circular geometric cross-section having a diameter ranging from approximately 5 mm to approximately 7 mm, which generally conforms to the outer peripheral geometry of the plug and which also improves design aesthetics, as well as device integrity compared to slipcovers that include one or more edges which may facilitate delamination via, for example, snagging of the edge on another component of the device or surrounding area.

It has been surprisingly discovered that the thickness of the second sub-component of plug 126 is important to plug integrity and, in turn, device longevity. Indeed, it has been determined that when the thickness of the second sub-component of plug 126 above first substrate 112 is reduced from approximately 125-150 microns down to approximately 20 microns, for example, via a reduction in spacer bead size, a substantial enhancement in plug adhesion is observed. It will be understood that the preferred size range for such spacer beads is approximately 1-50 microns, more preferably approximately 5-30 microns, and yet more preferably approximately 5-20 microns. The filler beads associated with the second sub-component of plug 126 are preferably fabricated from plastic beads, such as PMMA, hollow glass, spherical glass, and/or metal beads—just to name a few.

In accordance with the present invention, slipcover 130 is also preferably substantially parallel and/or parallel to first substrate 112. It will be understood that the term substantially as used herein with respect to the term parallel is defined as appearing to be parallel to an ordinary observer when viewed under a microscope at 10× magnification.

In another embodiment of the present invention, the second sub-component of plug 126 further comprises carbon black, which facilitates lower transmissivity—especially when the second sub-component of plug 126 is between approximately 10 and approximately 50 microns thick relative to surface 112A of first substrate 112.

When the thickness of the second sub-component of plug 126 above first substrate 112 is between approximately 10 and approximately 50 microns, a decrease in filler (e.g. fumes silica) concentration has also been recognized as a means to maintain desired viscosity during plug curing.

In accordance with the present invention, plug 126 may also optionally comprise one or more cure indicators which provide optical and/or measurable indication of the degree of plug curing. A first class of cure indicators preferably includes pH based cure indicators, such as phenolphthalein (0.25-0.5 parts per hundred resin "phr") and thymolphthalein (0.25-0.5 phr), which are available from Aldrich Chemical Company. A second class of cure indicators preferably includes free radical/reactive cure indicators such as Crystal Violet (0.25-0.5 phr), which is available from Aldrich Chemical Company. A third class of cure indicators preferably includes UV cure indicators such as Blue 55 (1-5 phr), which is available from Spectra Group Limited, Inc., Millbury, Ohio. It will be understood that the concentrations of cure indicators provided above are merely preferred operative concentrations, but are, in no way, limiting. To be sure, other concentrations that would be known to those having ordinary skill in the art are likewise contemplated or use in accordance with the present invention. It will be further understood that utilization of plug cure indicators to the formulation is advantageous in a production setting to insure that plug 126 has been exposed to UV light and/or is in a properly cured state.

Plug 126 may further optionally comprise one or more additives, such as, but not limited to, tougheners (e.g. Fortegra 100 (1-5 wt %) available from The Dow Chemical Company and MX136 core-shell toughener (25 wt % in Bis-F epoxy) available from Kaneka Corporation, Pasedena, Tex.), flexibilizers/crosslinkers (e.g. H2003 dendritic polymer (1-20 wt %) or CAPA polyols (1-20 wt %) available from Perstorp Polyols, Inc, Toledo, Ohio), and/or surface active agents (e.g. UV3570 (0.5-2.5 wt %) available from BYK-Chemie, Germany). It will be understood that plug tougheners and flexibilizers/crosslinkers are functionally self-explanatory, and that surface active agents can reduce the surface tension of the plug formulation and help repel the electrochromic medium during the plugging operation and reduce intermixing.

Electrochromic devices of the present invention can be used in a wide variety of applications wherein the transmitted or reflected light/heat can be modulated. Such devices include mirrors; aircraft transparencies; windows for the exterior of a building, home or vehicle; skylights for buildings including tubular light filters; windows in office or room partitions; and light filters for photographic devices and light sensors.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic device, comprising:
   a two-part plug associated with a fill port of the electrochromic device, the two-part plug comprising:
      a first part comprising a first resin that, in an uncured state, is substantially insoluble or substantially immiscible with an electrochromic medium;
      a second part comprising a second resin; and
   a slipcover in contact with the two-part plug, the slipcover comprising a metal, a colored glass, an etched glass, an abraded glass, an etched plastic, or an abraded plastic;
   wherein the slipcover is less than 0.85 mm thick.

2. The electrochromic device of claim 1, wherein the slipcover controls a transmissivity of the electrochromic device in a region proximal to the fill port.

3. The electrochromic device of claim 1, wherein the slipcover is less than 1 mm thick.

4. The electrochromic device of claim 1, wherein the slipcover is less than 0.7 mm thick.

5. The electrochromic device of claim 1, wherein the slipcover is a generally circular disc.

6. The electrochromic device of claim 5, wherein the generally circular disc has a diameter of from about 5 mm to about 7 mm.

7. The electrochromic device of claim 1, wherein the slipcover comprises a colored glass.

8. The electrochromic device of claim 1, wherein the slipcover comprises an etched glass.

9. The electrochromic device of claim 1, wherein the slipcover comprises an abraded glass.

10. The electrochromic device of claim 1 further comprising:
    a first substantially transparent substrate having a first surface, a second surface, and a first electrically conductive coating on the second surface, the slipcover being proximal to the first surface;
    a second substrate having a first surface, a second surface, and a second electrically conductive coating on a second surface;
    a sealing member joining the first substrate and the second substrate;
    the first electrically conductive coating and the second electrically conductive coating being in contact with the sealing member;

the first substrate, second substrate, and sealing member defining a chamber; and the fill port comprising an aperture in the first substrate;

wherein the second part of the two-part plug further comprises spacer beads and the spacer beads have an average particle size of from about 1 µm to about 50 µm.

11. The electrochromic device of claim 10, wherein a portion of the two-part plug disposed between the slipcover and the first surface of the first substrate comprises the spacer beads.

12. The electrochromic device of claim 10, wherein the spacer beads have an average particle size of from about 5 µm to about 30 µm.

13. The electrochromic device of claim 10, wherein the spacer beads have an average particle size of about 20 µm.

14. The electrochromic device of claim 10, wherein the spacer beads are comprises of polymethylmethacrylate, hollow glass, spherical glass, or metal.

15. The electrochromic device of claim 10 further comprising an electrochromic medium disposed within the chamber.

16. The electrochromic device of claim 15, wherein the electrochromic medium comprises a solvent, an anodic material, and at least one cathodic material, wherein the anodic material and the cathodic material are electroactive, and at least one of the anodic material and the cathodic material is electrochromic.

17. The electrochromic device according to claim 1, wherein the second part of the two-part plug further comprises carbon black.

18. The electrochromic device of claim 1 further comprising:

a first substantially transparent substrate having a first surface, a second surface, and a first electrically conductive coating on the second surface;

a second substrate having a first surface, a second surface, and a second electrically conductive coating on a second surface;

a sealing member joining the first substrate and the second substrate;

the first electrically conductive coating and the second electrically conductive coating being in contact with the sealing member;

the first substrate, second substrate, and sealing member defining a chamber; and the fill port comprising an aperture in the sealing member;

wherein the second part of the two-part plug further comprises spacer beads and the spacer beads have an average particle size of from about 1 µm to about 50 µm.

* * * * *